United States Patent [19]
Takeda et al.

[11] Patent Number: 6,091,538
[45] Date of Patent: Jul. 18, 2000

[54] GAIN EQUALIZING APPARATUS

[75] Inventors: Noriyuki Takeda; Shigeyuki Akiba; Noboru Edagawa; Hidenori Taga, all of Tokyo, Japan

[73] Assignee: Kokusai Denshin Denwa Kabushiki Kaisha, Tokyo, Japan

[21] Appl. No.: 08/987,433

[22] Filed: Dec. 9, 1997

[30] Foreign Application Priority Data

Dec. 9, 1996 [JP] Japan ................................. 8-328096

[51] Int. Cl.[7] ........................................................ H01S 3/00
[52] U.S. Cl. ......................... 359/341; 359/124; 359/349
[58] Field of Search .................................. 359/341, 349, 359/127

[56] References Cited

U.S. PATENT DOCUMENTS

| | | | |
|---|---|---|---|
| 5,392,154 | 2/1995 | Chang et al. .......................... | 359/341 |
| 5,452,116 | 9/1995 | Kirkby et al. ......................... | 359/127 |
| 5,675,432 | 10/1997 | Kosaka .................................. | 359/341 |
| 5,801,858 | 9/1998 | Roberts et al. ........................ | 359/114 |
| 5,905,838 | 5/1999 | Judy et al. ............................. | 385/123 |

OTHER PUBLICATIONS

Yamada et al, "Broadband and Gain–Flattened Amplifier Composed of a 1.55 $\mu$M–Band and a 1.58 $\mu$M–Band $Er^{3-}$–Doped Fibre Amplifier in a Parallel Configuration" Electronic Letters, pp. 710 and 711, Apr. 1997.

*Primary Examiner*—Mark Hellner
*Attorney, Agent, or Firm*—Christie, Parker & Hale, LLP

[57] ABSTRACT

An equalizing apparatus for equalizing gains of wideband wavelength-division multiplexed light and for improving the S/N ratio comprises a plurality of optical amplifyer for optically amplifying light in different wavelength groups, respectively; and multiplexer for multiplexing optically amplified light from said plurality of optically amplifying means.

10 Claims, 7 Drawing Sheets

GAIN EQUALIZING APPARATUS

FIELD OF THE INVENTION

This invention relates to a gain equalizing apparatus and, more particularly, to such for equalizing gains of individual wavelength lights in a wavelength division multiplexing transmission system.

BACKGROUND OF THE INVENTION

Wavelength division multiplexing transmission systems are remarked and widely studied as means for realizing optical fiber transmission with a large capacity over a long distance. In wavelength division multiplexing transmission systems, it is essential to make individual wavelength lights to coincide in peak values at least at a transmitter terminal. It is also preferable to make them coincide in the stage of repeating amplifiers as well.

Figure 7:
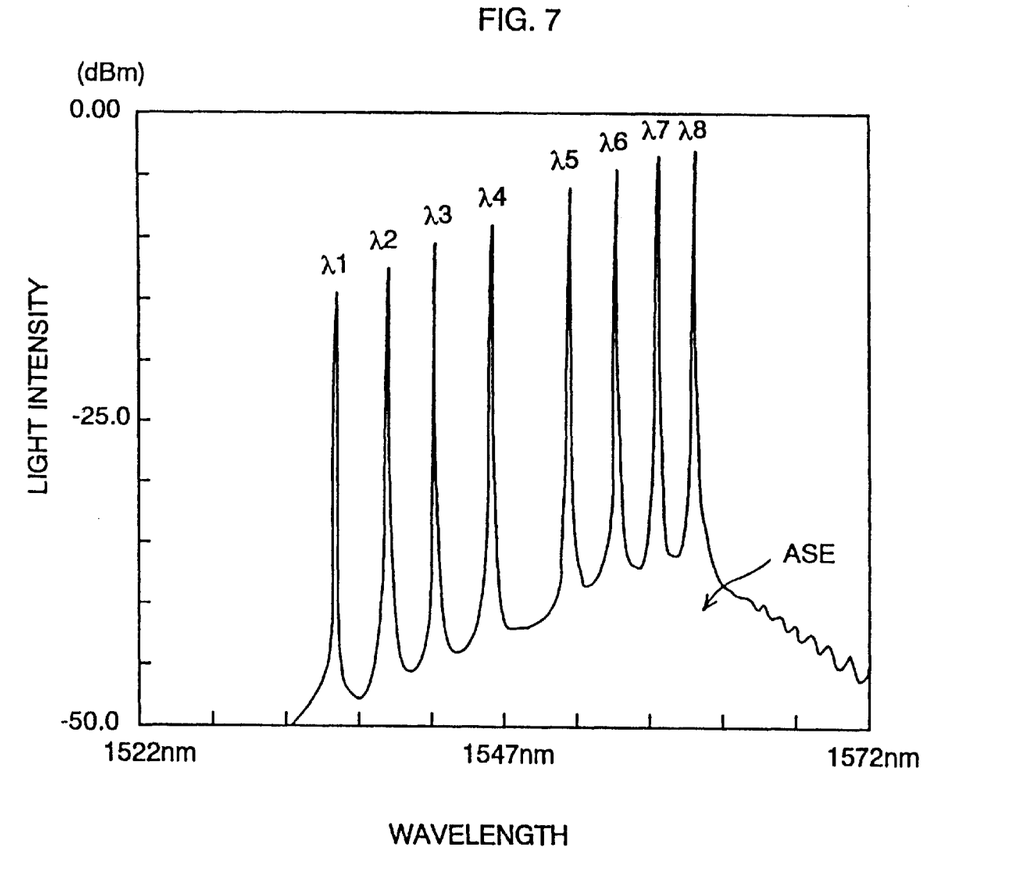
FIG. 7 is a diagram showing optical spectrums after optical amplification in a conventional system.

Erbium-doped optical fibers are widely used as media for amplifying wavelength division multiplexed signal lights, but it is difficult to obtain flat amplification wavelength characteristics within wavelength bands required in wavelength division multiplexing transmission systems. FIG. 7 schematically shows optical spectrums obtained by collectively amplifying wideband wavelength division multiplexed signal lights from 1535 nm to 1560 nm, equal in power, using a single optical amplifier. As shown, peak powers of individual wavelengths are not even, and tend to exhibit an inclined or arcuate profile, depending upon characteristics of amplifying mediums (wavelength distribution characteristics of ASE light (Amplified Spontaneous Emission light) and gains). Especially, it is largely affected by wavelength distribution of ASE light in optically amplifying medium.

There have been proposed, some gain equalizing means for reducing or removing variance in peak power among individual wavelengths of wideband wavelength division multiplexed signal light, such as a structure which uses an etalon filter having transmission characteristics of canceling wavelength characteristics of an optically amplifying medium and locates it downstream of the optically amplifying medium, or a structure which uses a fluoride fiber amplifier having more flat wavelength characteristics.

It is difficult, however, to equalize gains of wavelength division multiplexed signal light of a very wide band by using etalon filters. Further, fluoride fiber amplifiers have never been used in long-distance transmission, and involve an uncertainty in reliability of fluoride fibers themselves.

SUMMARY OF THE INVENTION

It is therefore an object of the invention to provide a gain equalizing apparatus which uses an existing device confirmed in reliability and can equalize gains of wideband wavelength division multiplexed signal lights.

It is further object of the invention to provide a gain equalizing apparatus which can equalize the gain of wavelength division multiplexed signal lights to the wide extent of wavelength.

According to the invention, different wavelength groups of light are optically amplified by different optical amplifier means and then multiplexed (wavelength-division multiplexed). This construction permits each optical amplifier means to have characteristics suitable for a wavelength group assigned thereto, and can realize optimum amplification characteristics as a whole even over a wide spectral range.

When the system includes optical wavelength restrictive means for restricting optical wavelengths for a necessary wavelength group, undesirable components contained in optically amplified light in each wavelength group can be removed. As a result, it is also possible to equalize levels of ASE light when all wavelength groups are multiplexed, and this contributes to an improvement in S/N ratio.

The optical wavelength restrictive means may be an optical filter for mainly passing light of the assigned wavelength group, or an optical filter for removing wavelengths outside its assigned wavelength group.

When the system includes demultiplexing means for demultiplexing entered wavelength-division multiplexed light into the wavelength groups, its application can be extended to a repeating amplifier.

DESCRIPTION OF THE PREFERRED EMBODIMENTS

Figure 1:
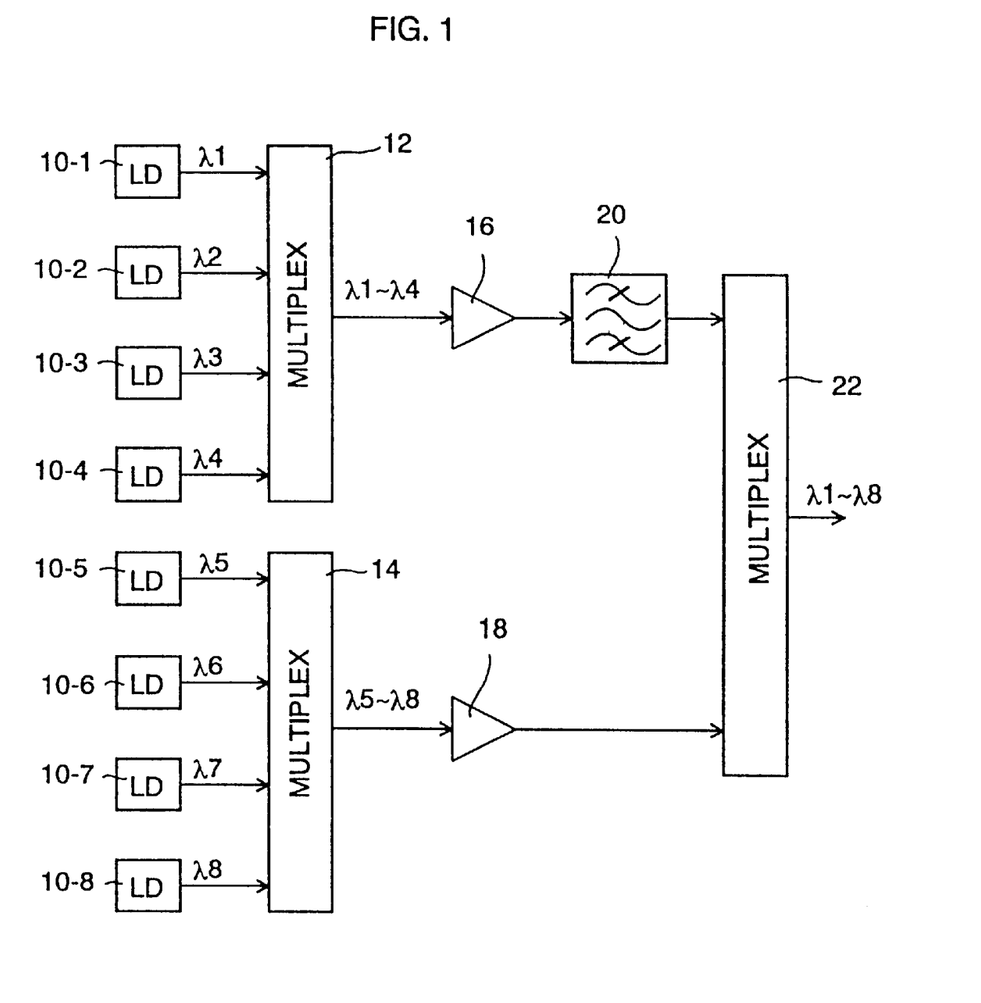
FIG. 1 is a schematic block diagram showing a general construction of an embodiment of the invention applied to light sending station.

FIG. 1 is a schematic block diagram showing a general construction of an embodiment of the invention applied to light sending station. In this embodiment, eight wavelengths $\lambda 1$ to $\lambda 8$ within the wavelength band of 1530 nm to 1560 nm similar to that explained with the conventional system referring to FIG. 7 are wavelength-division multiplexed. Reference numerals 10-1 through 10-8 denote laser diode modules which generate optical signals of wavelengths $\lambda 1$ to $\lambda 8$ substantially equal in peak power, respectively.

Optical outputs from the laser diode modules 10-1 through 10-4 are added (wavelength-multiplexed) by a multiplexer 12, and optical outputs from the laser diode modules 10-5 through 10-8 are added (wavelength-multiplexed) by a multiplexer 14. Optical output from the multiplexer 12 is optically amplified by an optical amplifier 16 designed to optically amplify the wavelength bands of $\lambda 1$ to $\lambda 4$ equally, and optical output from the multiplexer 14 is optically amplified by an optical amplifier 18 designed to optically amplify the wavelength bands of $\lambda 5$ to $\lambda 8$ equally.

As explained with the conventional system, if signal lights in the band of 1530 nm through 1540 nm are optically amplified by an existing erbium-doped optical fiber amplifier, intensive ASE light around 1560 nm intermixes. In this embodiment, however, the optical filter 20 removes ASE light, i.e. light in wavelength bands longer than $\lambda 4$, from optical output of the optical amplifier 16. Although an etalon filter with a large FSR (Free Spectral Range) (about 40 nm) was used as the optical filter 20 in a test, an optical bandpass filter for passing wavelength λ1 to λ4, or an optically band-eliminating filter for removing the undesired 1560 nm band may be used. Alternatively, the optical filter 20 may be a long-cycle fiber grating having similar characteristics. Typically, the optical filter 20 unevenly affects (attenuates) wavelengths λ1 to λ4 as well, the affection is compensated by inclining gains of wavelengths λ1 to λ4 of the optical amplifier 16.

The multiplexer 22 adds output light of the optical filter 20 and that of the optical amplifier 18, output light from the multiplexer 22 contains optical signals of wavelengths λ1 to λ8, and is output to an external element, such as optical fiber line.

Figure 2:
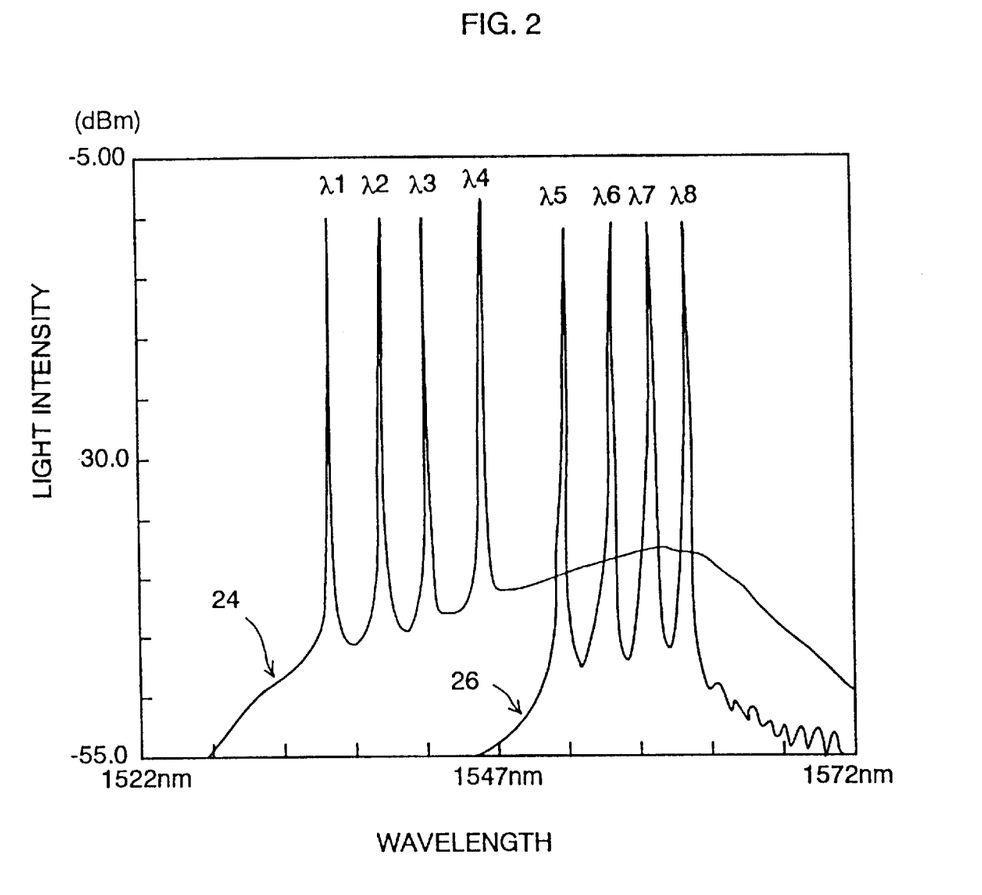
FIG. 2 is a diagram showing optical spectrums of output light from optical amplifiers 16, 18.

FIG. 2 shows optical spectrums of output light from the optical amplifiers 16, 18. Numeral 24 denotes the optical spectrum of output light from the optical amplifier, and 26 denotes the optical spectrum of output light from the optical amplifier 18. As understood from the optical spectrum 24, the optical amplifier 16 amplifies the wavelengths λ1 to λ3 substantially equally, but amplifies the wavelength λ4 so as to increase its peak power slightly higher than the wavelengths λ1 to λ3, taking attenuation of the wavelength λ4 by the optical filter 20 into account. Also, as understood from the optical spectrum 26, the optical amplifier 18 is adjusted to optically amplify the wavelengths λ5 to λ8 equally because the wavelengths λ5 to λ8 approximately coincide with the peak band of ASE light.

Figure 3:
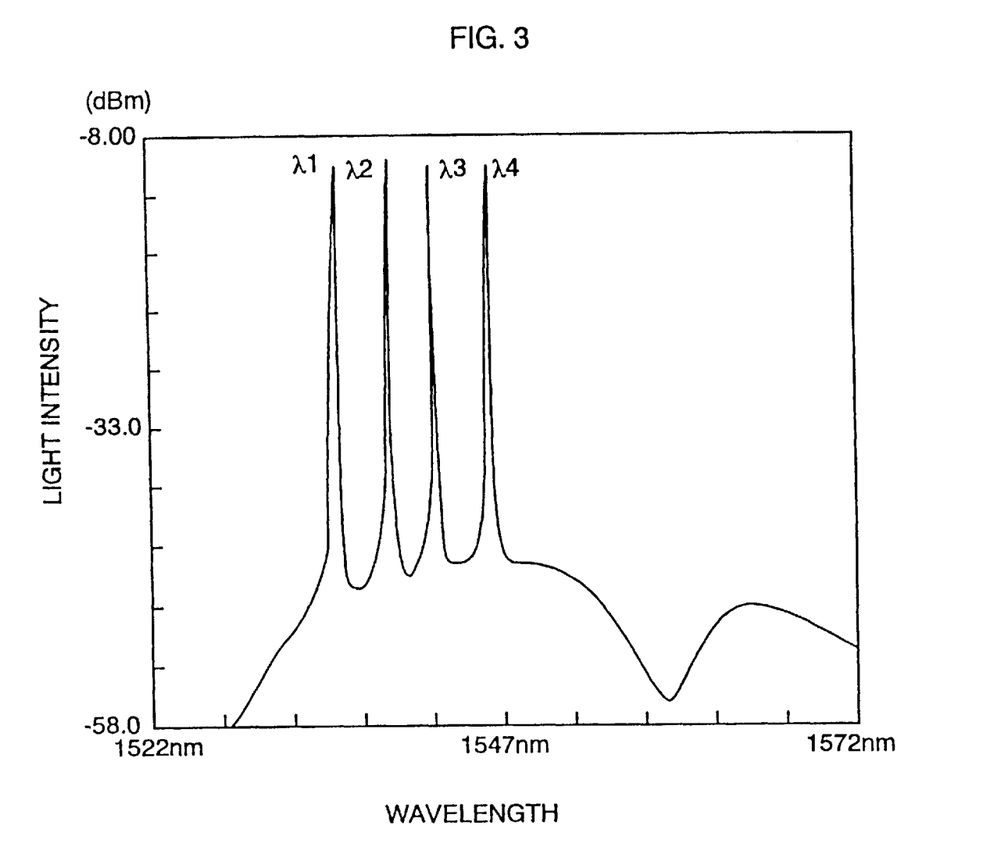
FIG. 3 is a diagram showing optical spectrums of output light from an optical filter 20.

FIG. 3 shows optical spectrums of output light from the optical filter 20. The band of 1560 nm is largely cut off by the optical filter 20. The peak power of λ4 coincides with the peak powers of the wavelengths λ1 to λ3.

Figure 4:
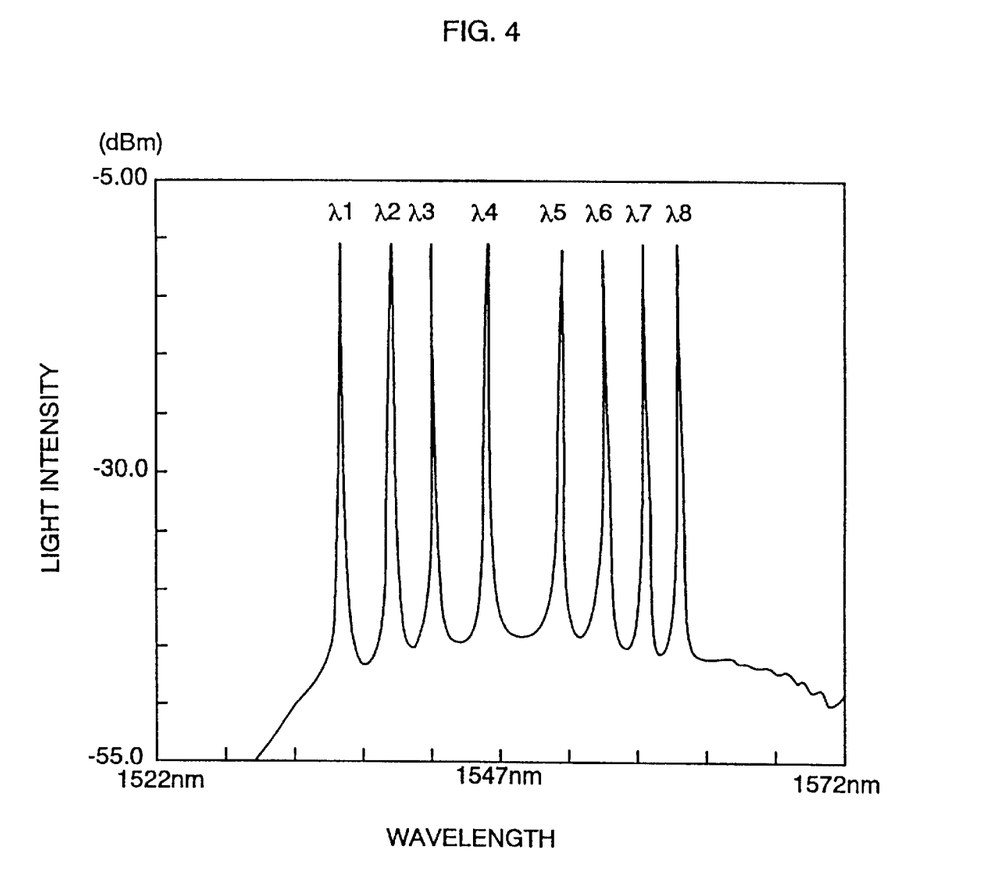
FIG. 4 is a diagram showing optical spectrums of output light from a multiplexer 22.

FIG. 4 shows optical spectrums of output light from the multiplexer 22. As understood from FIG. 4, peak powers of all wavelengths λ1 to λ8 are substantially equal. ASE light as bias is even in the wavelength range of λ1 to λ8, and therefore S/N ratios of these signal lights are approximately equal.

In this manner, the embodiment can obtain wavelength division multiplexed light which is even both in peak power and in S/N ratio of individual signal lights.

Although the embodiment shown in FIG. 1 uses no Fri. optical filter connected to the output of the optical amplifier 18, an optical filter eliminating the wavelengths λ1 to λ4 or an optical filter for mainly passing the wavelengths λ5 to λ8 may be connected to the output of the optical amplifier 18.

Figure 5:
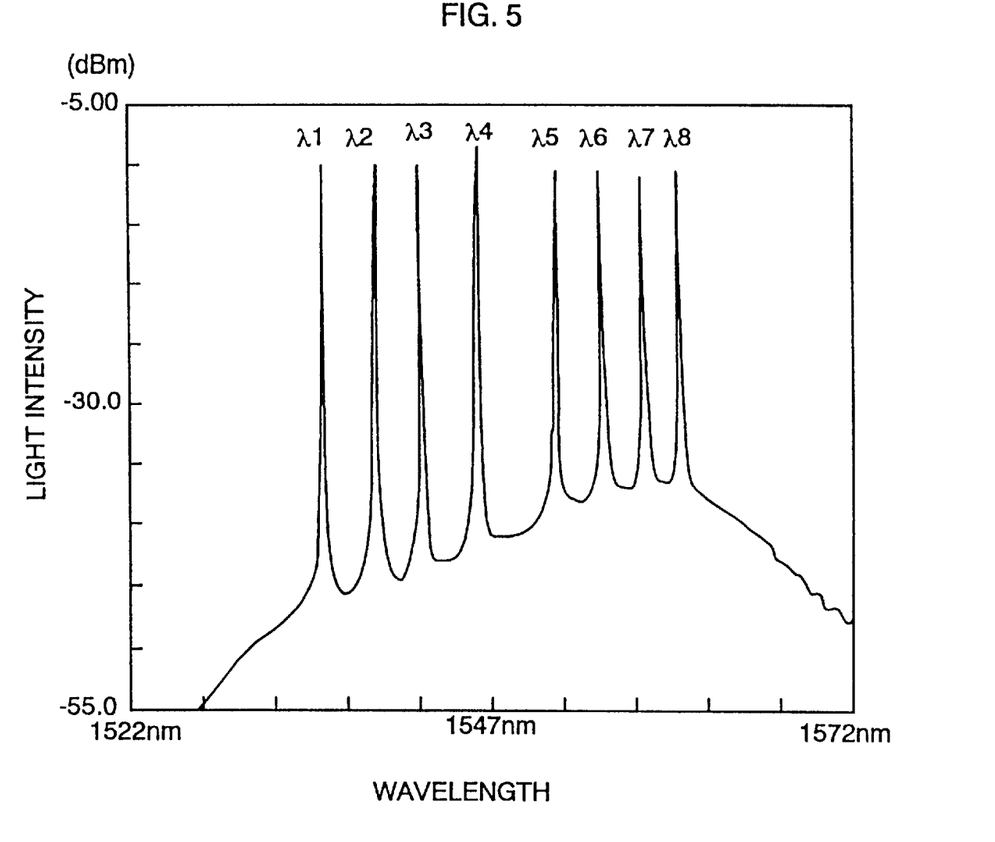
FIG. 5 is a diagram showing spectrums of output light from the multiplexer 22 when the optical filter 20 is removed.

For reference, optical spectrums of output light from the multiplexer 22, not using the optical filter 20, are shown in FIG. 5. It is easy to approximately equalize peak A powers of groups (the group of the wavelengths λ1 to λ4 and the group of λ5 to λ8). However, fine adjustment of pumping light of the optical amplifiers 16, 18 is required for coincidence in peak power between the groups. Between the groups, even when the peak powers coincide, there is a difference in intensity of ASE light, and coincidence in S/N ratio is very difficult. This problem, however, can be readily overcome by using the optical filter 20.

Figure 6:
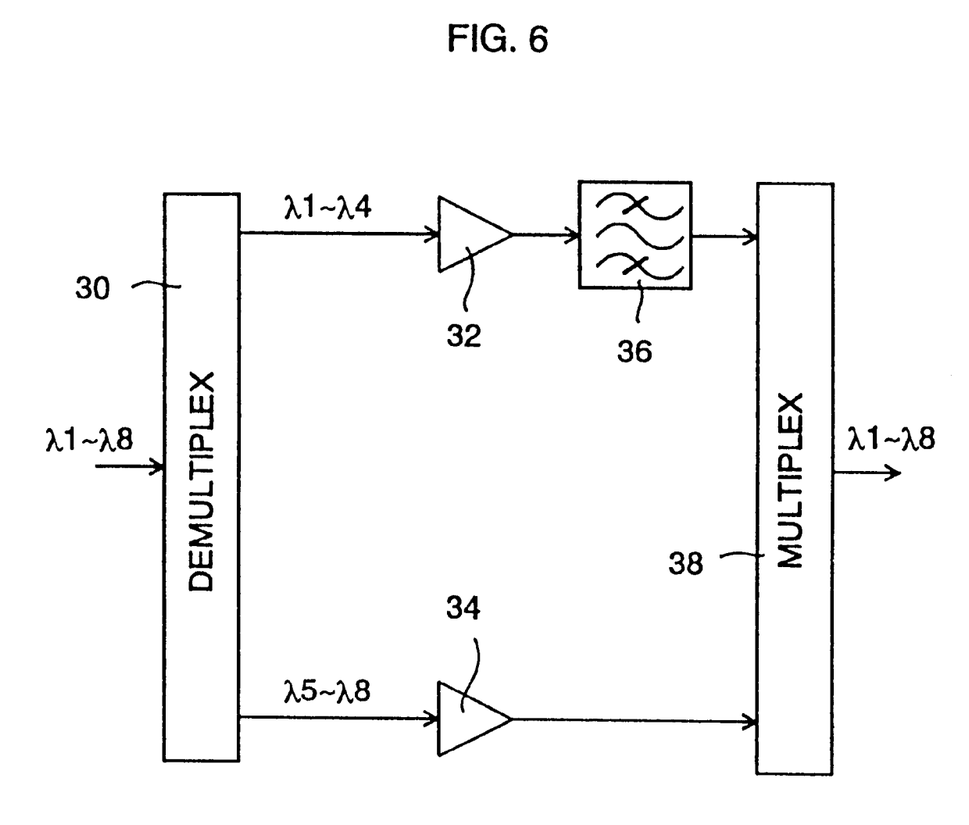
FIG. 6 is a schematic block diagram showing a general construction of the embodiment of the invention applied to an optical repeater.

FIG. 6 is a schematic block diagram showing a general construction of an embodiment of the invention applied to an optical repeater. Wavelength division multiplexed light of wavelengths λ1 to λ8 is introduced into a demultiplexer 30. The demultiplexer 30 demultiplexes the wavelength division multiplexed light into two groups, λ1 to λ4 and λ5 to λ8 Usable as the demultiplexer 30 for this purpose are, for example, a construction which divides the input light into two parts and then extracts desired wavelength band from each of the divided lights, a construction which divides the incident light into eight divisional groups by an 8×8 optical coupler and then extracts and multiplexes desired wavelengths from the divisional groups of light, or a construction which divides the input light into respective wavelengths by an arrayed waveguide grating and then multiplexes desired wavelengths.

The optical amplifier 32 is designed for wavelengths λ1 to λ4 like the optical amplifier 16 and optically amplifies the group of wavelengths λ1 to λ4 output from the demultiplexer 30. The optical amplifier 34 is designed for wavelengths λ5 to λ8 like the optical amplifier 18 and optically amplifies the group of wavelengths λ5 to λ8 output from the demultiplexer 30. The optical filter 36 has the same input/output characteristics as those of the optical filter 20 and removes light in undesired bands from the output light of the optical amplifier 32. The multiplexer 38 multiplexes output light from the optical filter 36 and output light from the optical filter 34 like the multiplexer 22. Thus, the output light from the multiplexer 38 is wavelength division multiplexed light in which each of wavelengths λ1 to λ8 in the input light of the demultiplexer 30 is optically amplified and multiplexed.

With this arrangement, wavelengths can be optically amplified respectively to equalize peak powers also in the optical repeater. Additionally, since intensities of ASE light, also, can be made approximately even among different wavelengths, also S/N ratios can be made approximately even among different wavelengths.

Explanation has been made as employing 8 wavelengths, the embodiment can apparently be extended to more wavelengths. The group of wavelengths explained as containing four wavelengths may contain two wavelengths. Although it is possible to contain only one wavelength in one group, it results in requiring many optical amplifiers and optical filters, and will be inefficient.

It will readily be understood from the foregoing description that the invention can equalize peak powers of different wavelengths in wideband wavelength division multiplexed light. By using optical filter means for passing desired bands in each wavelength group or for removing undesired bands, undesired ASE light can be suppressed, and S/N ratios of different wavelengths can be made even. These effects ensure realization of optical transmission using a wider band over a longer distance.

What is claimed is:

1. A gain equalizing apparatus, comprising:
   a plurality of optical amplifying means for optically amlplifling light, each of the optical amplifying means adapted to amplify a different wavelength group of said light wherein each of said wavelength groups comprises one or more wavelengths; and
   multiplexing means for multiplexing optically amplified light from said plurality of optical amplifying means.

2. A gain equalizing apparatus, comprising:
   a plurality of optical amplifying means for optically amplifying light, each of the optical amplifying means adapted to amplify a different wavelength group of said light;
   multiplexing means for multiplexing optically amplified light from said plurality of optical amplifying means; and
   optical wavelength restrictive means between one of said optical amplifying means and said multiplexing means for restricting an optical wavelength band of said optically amplified light from said one of said optical amplifying means.

3. The gain equalizing apparatus according to claim 2 wherein said optical wavelength restrictive means comprises an optical filter for passing substantially only light in said wavelength group of said one of said optical amplifying means.

4. The gain equalizing apparatus according to claim 2 wherein said optical wavelength restrictive means comprises an optical filter for eliminating wavelengths outside said wavelength group of said one of said optical amplifying means.

5. A gain equalizing apparatus, comprising:
first optical amplifying means for optically amplifying light in a first wavelength group;
second optical amplifying means for optically amplifying light in a second wavelength group;
optical wavelength restrictive means for restricting an optical wavelength band of an optical output from said first optical amplifying means; and
multiplexing means for multiplexing an optical output from said optical wavelength restrictive means and an optical output from said second optical amplifying means.

6. The gain equalizing apparatus according to claim 5 wherein said optical wavelength restrictive means comprises an optical filter for passing substantially only light in said first wavelength group.

7. The gain equalizing apparatus according to claim 5 wherein said optical wavelength restrictive means comprises an optical filter for eliminating wavelengths outside said first wavelength group.

8. The gain equalizing apparatus according to claim 5 wherein said optical wavelength restrictive means comprises an optical filter for eliminating wavelengths in said second wavelength group.

9. The gain equalizing apparatus according to claim 5 further comprising demultiplexing means for demultiplexing incoming wavelength division multiplexed light into said first and second wavelength groups.

10. A method for equalizing gain, comprising the steps of:
optically amplifying each of a plurality of separate divisional wavelength groups;
restricting one or more of said optically amplified divisional wavelength groups to an optical wavelength band; and
multiplexing said restricted one or more of said optically amplified divisional wavelength groups and said optically amplified divisional wavelength groups which are not restricted.

* * * * *